United States Patent [19]

Vinz

[11] Patent Number: 4,776,176
[45] Date of Patent: Oct. 11, 1988

[54] LIQUID EXCHANGE SYSTEMS

[76] Inventor: Peter Vinz, Paoso Str. 24a, D 8000 München, Fed. Rep. of Germany

[21] Appl. No.: 108,073

[22] Filed: Oct. 13, 1987

[30] Foreign Application Priority Data

Oct. 20, 1986 [DE] Fed. Rep. of Germany ....... 3635601
May 16, 1987 [DE] Fed. Rep. of Germany ....... 3716455

[51] Int. Cl.$^4$ .............................................. F25B 15/00
[52] U.S. Cl. ...................................... 62/101; 62/476; 62/483
[58] Field of Search ................ 62/426 X, 483 X, 485, 62/148, 101

[56] References Cited

U.S. PATENT DOCUMENTS

| | | | |
|---|---|---|---|
| 3,296,823 | 1/1967 | Novak et al. | 62/483 X |
| 3,721,109 | 3/1973 | Porter | 62/476 |
| 4,580,407 | 4/1986 | Aime et al. | 62/148 |
| 4,596,122 | 6/1986 | Kantner | 62/148 X |
| 4,691,532 | 9/1987 | Reid et al. | 62/483 X |
| 4,706,464 | 11/1987 | Kreutmair | 62/476 X |

Primary Examiner—Lloyd L. King
Attorney, Agent, or Firm—McGlew and Tuttle

[57] ABSTRACT

The invention provides a method and apparatus for quantity controlled, continuous liquid exchange in distillation and absorption refrigerant circuits.

In the method on the one hand the pressure of a volumetric liquid flow, to be supplied to the high pressure zone at a defined rate, of enriched starting solution is raised from a low level to a high pressure level, while on the other hand the mutually separated liquid flows (which in sum are equal in amount) to be removed from the high pressure zone, of the product condensate and of the depleted solution, are transferred from a high pressure level to a low pressure level. In a solution exchange apparatus the method utilizes mechanical energy of the liquid flows (which are to be depressurized and to be removed from the apparatus) and only requires a small external boosting device to overcome internal frictional and intercomponent leakage. The liquid flows that are to be depressurized are for this purpose cooled down prior to mechanical energy transfer to a value below the saturation temperature of their respective relaxation pressure level. The apparatus is a displacement apparatus. In the case of application to absorption refrigerant circuits it is preferably driven with refrigerant vapor.

11 Claims, 4 Drawing Sheets

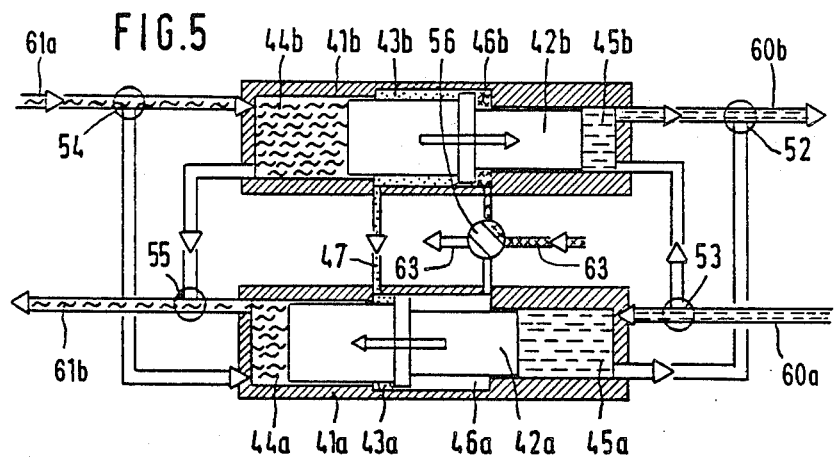
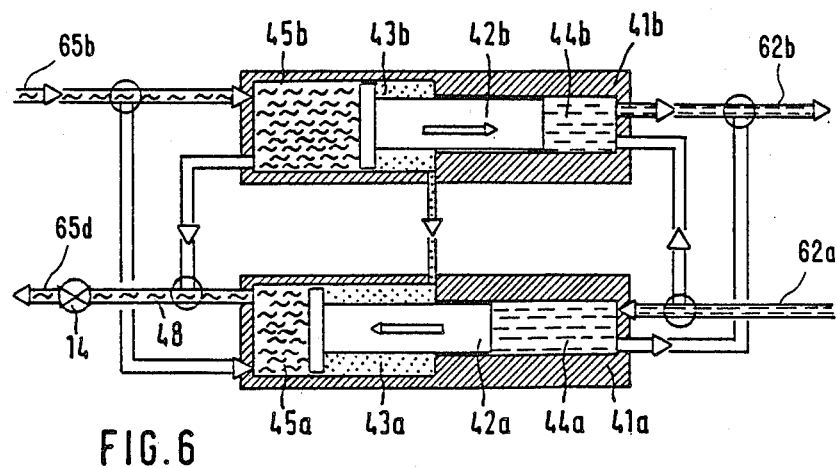

LIQUID EXCHANGE SYSTEMS

BACKGROUND OF THE INVENTION

The invention relates to a method and apparatus for quantity controlled, continuous liquid exchange in distillation plant and absorption refrigeration circuits in which on the one hand a liquid mass feed, to be controlledly supplied into the high pressure zone, of enriched starting solution is raised from a low pressure level to a high pressure level and on the other hand the liquid flows, which are separate from each other, are in sum the same in quantity and are to be withdrawn from the high pressure zone, of the product condensate and of the depleted solution are brought from a high pressure level to a low pressure level.

In such a mass separation plant continuous operation is only possible if on there is both a continuous feed of defined liquid mass flow of enriched starting solution into the separating apparatus and two liquid flows, which are equal in sum, that is to say the depleted solution and the product condensate, are continuously removed from the apparatus in equal quantity. It frequently occurs that this mass separation takes place at high saturation pressures, as for example in the case of the separation of ammonia and water in absorption refrigeration circuits for the generation of heat for heating purposes at saturation pressures between 20 and 30 bar, while the starting solution is available with a pressure between 1 and 5 bar.

In such cases mechanical energy is used to increase the pressure of the starting feed solution from a low pressure level to the high pressure level of mass separation and the liquid flows, which are to be discharged. These liquid flows are transferred in the reverse manner with the dissipation of a large amount of mechanical energy from the high pressure level of mass separation to the low pressure level of the enriched starting feed solution.

In order to perform such liquid exchange in a present-day separating plant, it is necessary to have a high pressure pump for feed of the enriched starting solution into the apparatus and a respective chock valve for the reduction in pressure of the liquid flows which are to be removed in equal quantity.

While an industrial high pressure distillation plant is in the majority of cases run at a defined load point and thus may operate with adjusted exchange mass flows, in the case of absorption heat pumps the mass separation rates and accordingly the quantities of liquid to be exchanged have to be continuously varied to suit changing requirements. The expenditure on automatic control systems is substantial and involves a large proportion the total costs. In the case of absorption heat pumps with a small producer rate there is the further difficulty that a defined exchange of relatively small amounts of liquid is necessary across relatively high pressure differentials, for which there are however no miniaturized, efficient pumps and choke means whose mass flow may be automatically controlled. Such components must have a robust, hermetically sealed design and must be able to be produced without excessive complexity and expense of manufacture.

Development has so far been centered on the design of such components on the basis of pumps with a reduced drive energy requirement, especially positive-displacement pumps of the most varied types such as gear pumps, diaphragm piston pumps or axial piston pumps.

The German Pat. No. 3,133,387 for example describes a positive displacement axial piston pump for the feed of solution in connection with low power absorption heat pumps, which is driven with refrigerant vapor produced in the high pressure zone. Although this pump is robust in design and may be operated continuously with a piston stroke rate in line with needs, there is the significant disadvantage that the pump is not able to utilize the mechanical energy released during the solution exchange as driving energy and thus the drive energy requirement of the pump is only reduced by an amount equal to the losses of the electric drive. Furthermore, the liquid flows to be removed, that is to say the depleted solution and the product condensate, still have to be adapted to the requirements, this involving an extensive automatic control system.

The German unexamined specification No. 3,227,030 describes a solution exchange apparatus in the form of an axial positive displacement machine, in the case of which the mechanical energy of the depleted solution to be removed from the apparatus is to be transferred to the enriched starting feed solution in order to reduce the energy requirement for the supply of the solution into the apparatus.

This solution exchange means does however suffer from the disadvantage that it is only capable of intermittent operation and that in it the depleted solution has a tendency to spontaneously form vapor bubbles in the displacement chamber, this interfering with the quantity regulated solution exchange and decreasing the working life of the apparatus. Furthermore, the hermetically sealed electromagnetic drive hardly leads to an economy in energy and is not sufficiently powerful to feed the larger mass flow of the starting solution into the high pressure zone taking into account internal losses of the apparatus and the additional pipe pressure losses. The apparatus furthermore fails to utilize the mechanical energy fraction of the refrigerant condensate which is to be continuously removed from the apparatus and to be depressurized so that for the controlled feed of the refrigerant into the refrigerant evaporator it is still necessary to have a controlled high pressure reducing valve.

SUMMARY OF THE INVENTION

Accordingly, one object of the present invention is to quantity control the liquid exchange in a distillation plant and absorption refrigerant circuits in an energy saving and continuous manner and in accordance with the respective need.

A further object of the invention is to provide a system which as regards operation techniques is substantially simpler than present day systems.

In order to achieve these or other objects in accordance with the invention the mechanical energy contained in the liquid flows that are to be removed and depressurized is transferred to the liquid feed flow which is to be pressurized, prior to the energy transfer the liquid flows to be depressurized are cooled down to a value under the saturation temperature of their respective relaxation level and the mechanical energy transfer is performed continuously in a liquid exchange apparatus operating on the displacement principle.

In this respect a particular advantage to be described later in connection with the drawings is that the complete mechanical energy transfer of all liquid flows participating in the exchange in the volumetrically pumping liquid exchange apparatus causes a marked reduction in the driving energy required for the feed of the enriched starting solution, and the supercooling preceding the mechanical energy transfer of the liquid flows to be removed from the high pressure zone and to be depressurized causes the spontaneous formation of vapor bubbles to be dependably reduced during the depressurisation within the liquid exchange apparatus, and the equal quantity liquid exchange thus takes place without any trouble. The volumetrically pumping liquid exchange apparatus furthermore offers the advantage that the driving energy requirement for the feed of the enriched starting solution is more or less completely independent from the system pressure difference to be overcome.

Furthermore the liquid exchange apparatus replaces the quantity controlled high pressure solution pump with its high driving energy requirement and the choke valves, which are also quantity regulated, in the outlet ducts for the product condensate and for the depleted solution, which like the pump are to be considered as being components of such plant which involves extensive maintenance. The quantity control means of such components presently have to be synchronized using extensive automatic control instrumentalities to enable the plant to be run continuously.

Further advantageous developments of the invention are defined in the claims.

In accordance with one possible feature of the invention to be described in more detail below in connection with the figures, applicable to a large scale industrial plant with a large time constant a particular advantage is to be obtained if the liquid exchange is performed in two independent exchange apparatuses so that preferably equal mass flows are mutually exchanged in the apparatus and one of the apparatuses is driven by the product condensate and the other is driven by the depleted solution flow. In this case exchange apparatuses may be run with different exchange quantities in order to provide adaptation to the target value and on attaining such value are resynchronized with each other. For a small scale plant, as for example household absorber heat pumps, it is better from the costs angle if all the liquid flows are exchanged in one apparatus, since in the case of the time constants applying in the present case shifting of the liquid may be readily compensated for using small integrated storage containers.

In accordance with a further advantageous development of the method of the invention applicable to absorption refrigerant circuits, it is an advantage if the liquid exchange apparatus for the depleted solution is driven by the product vapor tapped from the high pressure zone, which after expansion is passed into the lower pressure absorber and is absorbed by the depleted solution. In this case the liquid exchange apparatus is run with the lowest possible operating costs. In the case of the use of the method in distillation plant without the possibility of an absorption or condensation of the lower pressure vapor it is possible for the liquid exchanger to be driven either with externally generated condensable driving vapor or with a pre-pressure increase of the enriched starting solution to be fed into the liquid exchange apparatus.

In accordance with a further advantageous development the invention also provides a liquid exchange apparatus in the form of a rotary displacement machine as described below in connection with the drawings. In a compound hermetically sealed cylindrical machine housing there are a number of separate pumping chambers arranged successively along the axis so that they are sealed from the respectively adjacent pump chambers to prevent liquid transfer therebetween. In each pump chamber there is a rotor member supported on suitable bearing means so that it makes sealing contact on its periphery and at its end faces; two displacement rolling members, running in opposite longitudinal grooves in the machine housing, roll along the rotor member. The rotor members are keyed successively on a common shaft bearinged in the sealing end members of the machine housing. Between the individual rotor members there are end sealing elements of the individual pumping chambers, such elements also being placed on the shaft. Adjacent to the guide grooves of the displacing rolling members there are also axial longitudinal slots in the machine housing which are placed in front of and behind the inserted displacement rolling members in the direction of rotation of the rotor. These slots connect the rotating pumping spaces in the pumping chambers with the inlet and outlet ducts in the machine housing in a given setting of the rotor.

The invention also provides an advantageous technique for smoothing out pulsations in the pumped liquid in which, for example, the displacement rolling members placed opposite each other in the machine housing make rolling contact with a rotor member with three cams respectively offset by 120°, the variation in curvature from one cam to the next being continuous.

Furthermore, for ensuring an even load on the rotor shaft it is an advantage if the driving rotor members are arranged on the shaft with an angular offset of 60° in relation to the driving rotor members.

In the case of one form of absorption heat pump as described below with reference to the drawings, it is possible in an apparatus with a single rotary displacement machine, for the supercooled, depleted solution, enriched starting solution, the driving vapor, the supercooled refrigerant condenste and the bleed solution to be passed from the refrigerant evaporator in, for instance, independent pumping chambers in synchronism with the duty rate and to be adapted in quantity by virtue of the speed of the machine. In this case the speed of the machine is only adapted by virtue of control of the rate of the driving vapor.

In a system using two rotary displacement machines it is possible for the supercooled depleted solution and an equal-quantity fraction of the enriched solution to be pumped with the aid of the driving vapor, while the supercooled condensate, the bleed solution from the refrigerant evaporator and the residual flow of the enriched starting solution are pumped in the second machine. For special requirements this part of the flow of the enriched starting solution may also be present in a higher concentration.

As a basic principle of the invention, known rotary designs of displacement systems are suitable for the liquid exchanger, sliding and not only rolling sealing systems being suitable for the displacement spaces.

The invention will now be described with reference to the drawings.

BRIEF DESCRIPTION OF THE DRAWINGS

In the Drawings:

FIG. 5 is a diagrammatic representation of an axial piston solution exchanger adapted to be driven by vapor.

FIG. 6 is a diagrammatic representation of an axial piston solution exchanger without any auxiliary drive.

DESCRIPTION OF PREFERRED EMBODIMENTS

Figure 1:
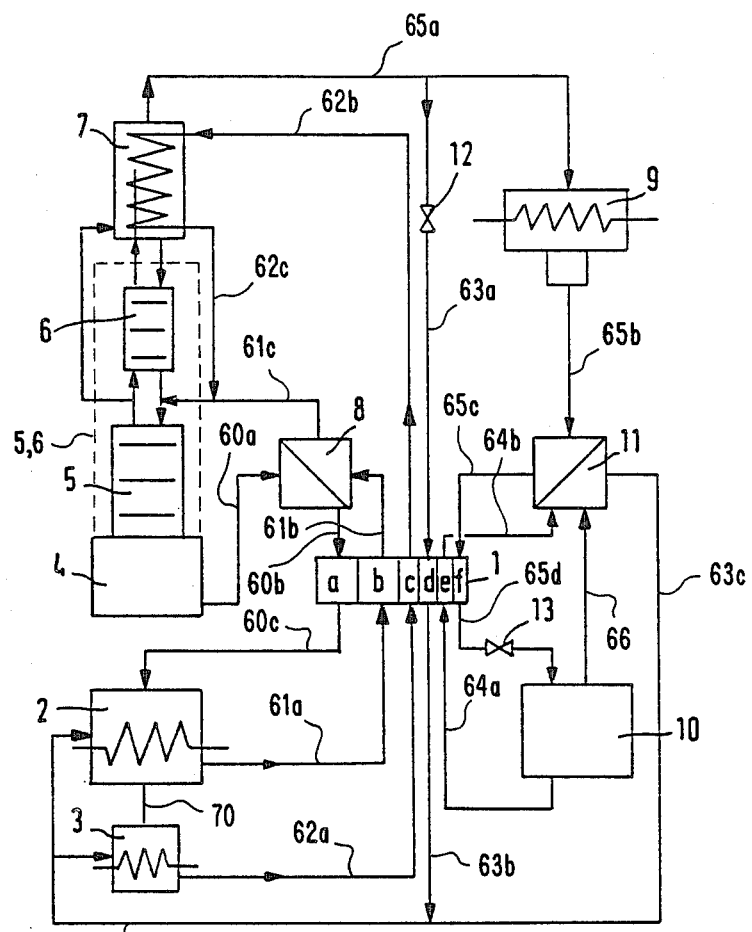
FIG. 1 is a diagrammatic view of an absorption refrigerant circuit with a rotary displacement solution exchanger.

FIG. 1 is a schematic of the flow relating to an $NH_3/H_2O$ absorption refrigerant circuit which is may be controlled continuously on a rotary displacement principle and which operates with a liquid exchange apparatus.

The rotary displacement machine 1 comprises the pumping spaces $1a$ to $1f$ with which the rotary machine exchanges six liquid flows with the pumping spaces in synchronism with the duty rate. For this purpose the pumping chambers $1a$ to $1f$ have lengths adapted to the different volumetric flows to be pumped.

The depleted solution is drawn off from a generator 4, directed through line $60a$ and through the heat exchanger 8 for supercooling. The depleted solution is then fed into the pumping chamber $1a$ via line $60b$. In the pumping chamber $1a$ the supercooled, depleted solution drives the internal rotor member. The depleted solution emerges from the pumping chamber $1a$ in a depressurized state and is passed via line $60c$ into the main flow absorber 2. The solution enriched with refrigerant vapor in the main flow absorber 2 is aspirated into the pumping chamber $1b$ via line $61a$ in a quantity equal to the quantity of the depleted solution (fed to chamber $1a$) and is then pumped out of the chamber via line $61b$ and is passed against the expelling pressure through the heat exchanger 8. The enriched solution is then fed into the head of the rectifying output part or lower portion of adiabatic rectification column 5, 6 via line $61c$.

The excess enriched solution is transferred to the subsidiary flow absorber 3 via line 70, in which it is enriched with further refrigerant vapor and the aspirated into the pumping chamber $1c$ via line $62a$. This part of the flow is also passed via line $62b$ against the expelling pressure firstly as a coolant through a dephlegmator 7 and then also fed via line $62c$ at the head into the rectifying output part or lower part of rectification column 5, 6.

The pumping chamber $1d$ is driven with refrigerant vapor. The latter is tapped upstream of the condenser 9 (line $65a$) and passed via the driving vapor valve 12 of line $63a$ to the pumping chamber $1d$, in which its pressure is reduced. It is then fed via line $63b$ into the lower pressure refrigerant duct $63c$ leading to the absorbers 2 and 3 and absorbed in the absorbers 2 and 3.

The pumping chamber $1e$ draws a mass flow proportional to the duty rate of refrigerant solution from the evaporator 10 via line $64a$ and passes it without any increase in pressure into the condensate supercooler 11 via line $64b$, where it more or less completely evaporates so that only a negligible residual flow finally passes via the low pressure cold vapor duct into the absorbers 2 and 3 via line $63c$.

The refrigerant condensate is fed from the condenser 9 via line $65b$ into the pumping chambers $1f$, such condensate having been previously supercooled in the condensate cooler 11 down to a temperature only a few degrees above the saturation temperature of the evaporator 10 and then fed to chamber $1f$ via line $65c$. The refrigerant condenste leaves the pumping chamber $1f$ with a slightly higher pressure than the pressure obtaining in the evaporator 10. The rest of the increase in pressure is overcome in a differential pressure equalizer 13 in line $65d$ prior to entry of the refrigerant condensate into the evaporator 10.

This liquid exchange apparatus thus adapts all liquid mass flows, which previously had to be individually regulated and synchronized, of the absorption refrigerant circuit only using the controlled driving vapor valve 12, which in the case of use in heat pumps receives the desired heating water temperature as the input control quantity.

Figure 2:
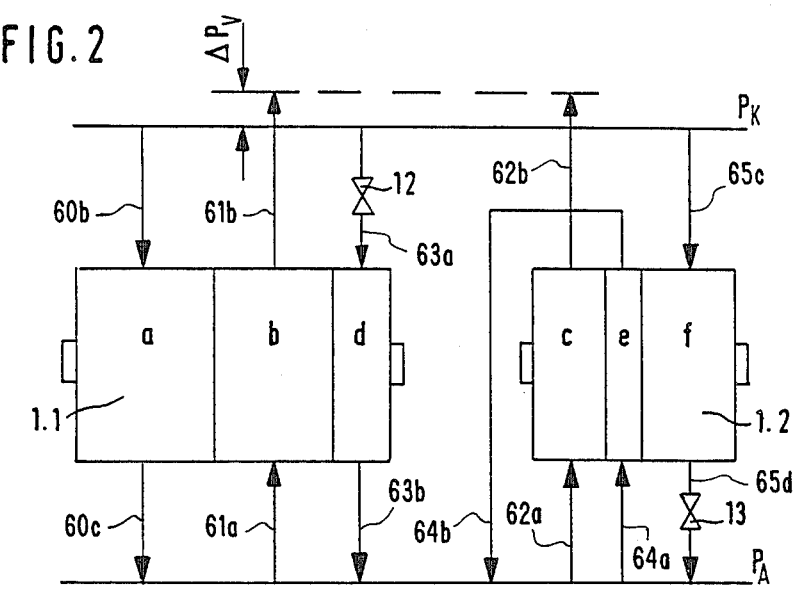
FIG. 2 is a diagrammatic representation of a two-part rotary displacement solution exchanger adapted to be driven by vapor.
Figure 3:
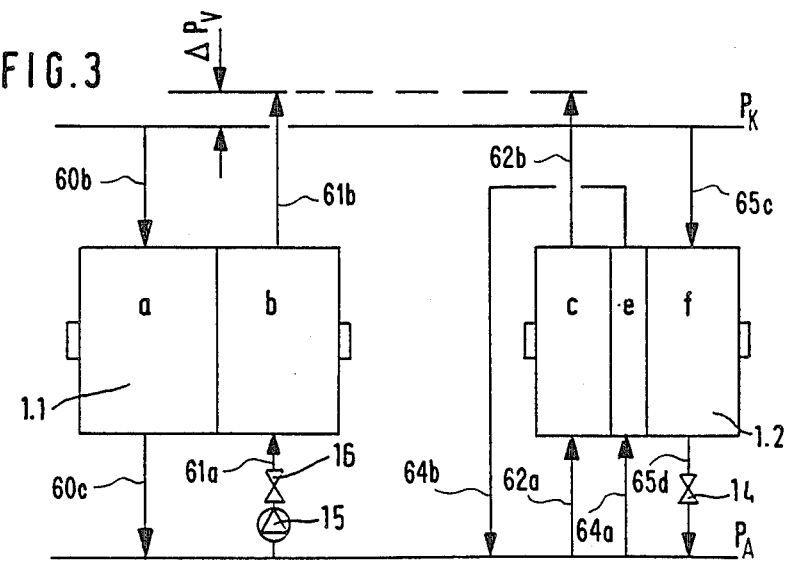
FIG. 3 is a diagrammatic representation of a two-part rotary displacement solution exchanger with drive by an auxiliary pump.

FIGS. 2 and 3 diagrammatically show alternative possibilities for the liquid exchange using rotary displacement machines. In FIG. 2 the pumping chambers $1a$ to $1f$ are divided up between two rotary displacement machines 1.1 and 1.2. While in the rotary displacement machine 1.1 the supercooled depleted solution flow is exchanged with the part of the flow corresponding thereto and equal in amount (in line $60b$, $60c$ and lines $61a$, $61b$, respectively), of the enriched starting solution with the aid of the driving vapor (in lines 63 and $63b$). In the rotary displacement machine 1.2 the product condensate and the remaining part, corresponding to this mass flow, of the flow of enriched starting solution (in line $62a$) are exchanged without the supply of external energy. The driving energy of the product condensate flow is furthermore sufficient to meter out the bleed solution (in line $64a$) from the evaporator 10 in the same apparatus.

Both of the rotary displacement machines operate in a steady-state equilibrium at a synchronous speed and may have their speeds of rotation changed for non-steady-state load adaptation. For these possibilities in the machine 1.1 it is possible for the driving vapor valve 12 to be continuously regulated and in the case of the machine 1.2 the condensate valve 13 may be continuously regulated. FIG. 3 shows the drive of the machine 1.1 as an alternative to a driving vapor drive (chamber $1d$ in FIGS. 1 and 2) involving increase in the feed pressure of the enriched solution flow. In this case the lower pressure pump 15 and the regulating valve 16 are used to raise the feed pressure of the feed pumped flow of the enriched starting solution and to meter it in quantity.

Furthermore FIGS. 2 and 3 symbolically show the pressure levels and the exchange directions of the liquid flows participating in exchange. $P_K$ is the high condensate pressure and $P_A$ is the low absorption pressure. $\Delta P_v$ denotes the losses in the machines and piping, which in toto determine the requirement for additional energy.

Figure 4:
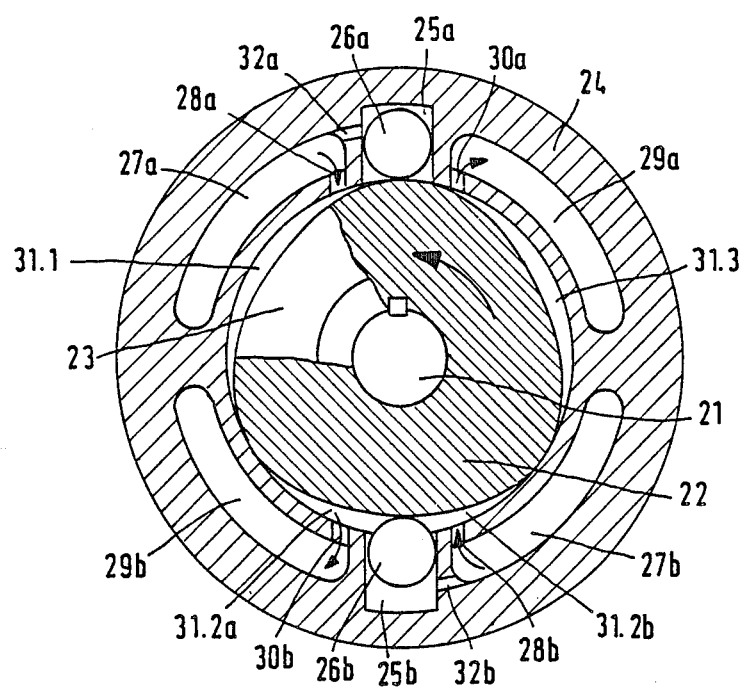
FIG. 4 is a cross section taken through one pumping chamber of the rotary displacement solution exchanger.

FIG. 4 shows one possible constructional form of the rotary displacement machine by a vertical cross sectional view through one of the tandem-arranged pumping chambers.

In the center there is a continuous rotor shaft 21, along which for each of the pumping chambers a rotor member 22 and the associated end sealing elements 23 are arranged in an alternate sequence, the rotor members 22 being keyed on the shaft. They are surrounded by the cylindrical machine housing 24 and may rotate within it with a minimum amount of play.

Two respective feed ducts 27a and 27b with inlet slots 28a and 28b and two respective expelling ducts 29a and 29b with outlet slots 30a and 30b are placed respectively in front of an behind with a distribution over the periphery of the machine housing 24 and symmetrically in relation to the two guide grooves 25a and 25b, which serve to accept the displacement rolling members 26a and 26b.

Symmetrically about the periphery, each of the pumping chambers placed in sequence has three rotating pumping spaces 31.1, 31.2 and 31.3, which in the radial direction inwardly are delimited by the rotor outline and in the outward direction are delimited by the cylindrical internal surface of the machine housing 24, while in the longitudinal direction they are delimited at the end faces by axial sealing elements 23. Within the machine housing 24 connecting ducts 32a and 32b lead from the pressure receiving feed ducts 27a and 27b for the drive liquid and from the pressurized ducts for the pumping liquid to the floor of the guide grooves 25a and 25b so that the displacement members 26a and 26b have their back sides supplied with liquid under pressure and are loaded by the pressure of such liquid on the rotor member 22 and are able to roll along its surface. In this respect the displacement rolling members 26a and 26b within the pumping chamber seal off the high pressure zones from the low pressure ones.

In the case illustrated the high pressure liquid flows out of the feed duct 27a via the inlet slot 28a into the pumping space 31.1, whereas the liquid flows out of the part of the pumping space 31.2a in a depressurized state into the pumping duct 29b. Even at this time high pressure liquid again flows out of the feed duct 27b via the inlet slot 28b into the part of the pumping space 31.2b, which is sealed off from the part of the pumping space 31.2a by the displacement roller members 26b.

The pumping space 31.3 filled with liquid is connected in the design illustrated via the outlet slot 30a with the pumping duct 29a so that the bleeding off of the depressurized liquid filling is commenced, when the filling of the pumping space 31.1 has just been terminated. The rate of emptying of the part of the pumping space 31.2a and the rate of filling of the part of the pumping space 31.2b however reach their maximum values at this rotor setting.

The turning motion of the rotor member 22 also causes the pumping spaces 31.1 to 31.3 during the driving action of the rotor member 22 to be moved from the high pressure zone into the low pressure zone and during driving of the rotor member 22 from the low pressure zone into the high pressure zone and the liquid fillings are ejected by means of the displacement rolling members 26a and 26b. In this respect it is convenient if the machine housings 24 of the driving pumping chambers are set in a row offset by 90° in relation to the driven pumping chambers, since it is in this manner that the low pressure zones and the high pressure zones of the individual pumping chambers are moved towards each other.

FIGS. 5 and 6 show the functional principle of the liquid exchange apparatus constructed in the form of an axial piston machine.

FIG. 5 shows an axial piston solution exchanger, which receives the supercooled depleted solution and an equally large mass flow of enriched starting solution and is driven with high pressure refrigerant vapor.

FIG. 6 shows an axial piston solution exchanger for supplementary liquid exchange which receives the supercooled refrigerant condensate and the remaining part of the flow of enriched starting solution. This solution exchanger operates without externally supplied energy. Both the axial piston solution exchangers are necessary as a combination, if the energy transfer during solution exchange is to be as complete as possible.

The design and workings of the axial piston solution exchanger driven by vapor as shown in FIG. 5 will now be described.

A piston 42a runs in a cylinder 41a and cooperates with the inner faces of the cylinder 41a in delimiting four spaces 43a to 46a, which during an axial motion of the piston 42a become larger on the one side and become smaller on the other side. Continuous pumping is possible inasfar as two similar cylinders 41a and 41b are oppositely coupled and moved backwards and forwards in alternate strokes. The ganged opposite motion of the two pistons 42a and 42b is ensured either by mechanical or (as shown) by hydraulic means, the piston spaces 43a and 43b being connected together via a duct 47, which together with the two spaces 43a and 43b is filled with an incompressible medium.

The spaces 44a and 44b receive enriched solution and the oppositely placed spaces 45a and 45b receive the supercooled depleted solution. If now the piston 42a is moved from its right hand terminal position to the left, the piston 42b will be moved to the right out of its left end position. Then, under the action of condensate under pressure, the space 45a will fill with supercooled depleted solution and on the other side the enriched solution will be moved from the space 44a against the action of a pressure which has the same or a higher value. In the same working stroke under the action of the absorber pressure the space 44b in the cylinder 41b is filled and supercooled enriched solution at the same pressure is expelled from the space 45b. On reaching the left-hand terminal position the direction of motion of the pistons 42a and 42b is reversed.

In order to overcome the internal frictional losses of the pistons and the external frictional pressure loss of the solution flows this axial piston solution exchanger is additionally driven with refrigerant vapor. For this purpose the spaces 46a and 46b are alternately available. If for instance the space 46b receives vapor from the condenser, the space 46a will be opened and put in communication with the absorber so that the piston 42a is relieved on one side and the two pistons may be moved from any position with the supply of vapor.

The aspiration duct 60b and pressure ducts for the depleted solution (48 and 49) and for the enriched solution (61b and 61a respectively) are shut off from each other by pressure-actuated reverse flow valves 52 to 55. Via the control device 56 the supply of vapor (line 63) and thus the pumping rate of the continuously acting axial piston solution exchanger may be set.

The axial piston solution exchanger driven by the refrigerant condensate to be discharged, see FIG. 6 showing lines 65b, 65d, 62b and 62a, operates without external driving energy and thus without piston spaces for vapor drive. For adjustment of the pumping rate and for avoiding spontaneous vapor bubble formation while pressure is being relieved in the spaces 45a and 45b receiving the refrigerant condensate the condensate valve 14 is arranged in the discharge duct 48. The condensate valve 14 serves to relieve the remaining gage pressure of the refrigerant condensate prior to entry into the evaporator.

I claim:

1. A method for efficient quantity controlled continuous fluid exchange in dynamically loaded distillation plants and absorption refrigeration systems having similar high pressure system components connected in series including an externally high pressure heated generator (4), an adiabatic rectification column (5) and (6), a recuperatively cooled dephlegmator (partial condensor) (7), and externally cooled condenser (9), a recuperatively and/or externally cooled condensate cooler and a recuperatively cooled solution heat exchanger (8) and different low pressure system components connected in series in these high pressure components, these low pressure components are in the case of distillation plants vessels receiving starting enriched solution, depleted solution and product condenste, and in the case of refrigeration systems these components are an externally heated evaporator (10) and an externally cooled absorber (2) and (3), comprising the steps of exchanging fluid between the high pressure system components and the low pressure system components continuously in a pressure energy recovering liquid exchange apparatus (1) operating on the displacement principle;

driving the liquid exchange apparatus in a controllable manner by one of internal and an external auxiliary energy source comprising the steps of: p1 splitting the enriched starting solution flow before entering the liquid exchange apparatus (1) into two partial flow rates where a first flow rate, (61), is equal in mass flow rate to the depleted solution flow (60) and a second flow rate (62) is equal to a product condensate flow (65), transferring both enriched solution flow rates (61) and (62) in separate displacement chambers (1b) and (1c) of the liquid exchange apparatus (1) into the high pressure zone;

transferring the partial flow of enriched solution (61) through the recuperative solution, heat exchanger (8) receiving the total waste heat of the depleted solution flow (60) withdrawn from the high pressure generator (4) so that the depleted solution flow is cooled down to a temperature below the saturation temperature of its respective final low pressure level before entering the displacement chamber (1a);

transferring the second enriched solution flow (62) as cooling medium through the recuperative dephlegmator (7) and then supplying the second enriched solution flow together with the first enriched solution flow (61) into the high pressure rectification column (5,6);

cooling down the high pressure product condensate flow (65) in a recuperative condensate cooler (11) to a temperature below the saturation temperature of its respective depressurization level in the liquid exchange apparatus (1) before entering its displacement chamber (1f);

indirectly cooling the condensate flow (65) by a cold vapor (66) leaving the evaporator (10) and by a portion of saturated evaporating low pressure liquid (64) withdrawn from the evaporator 10 and;

continuously transferring the saturated liquid flow (64) through the displacement chamber (1e) into the condensate cooler (11) and;

depressurizing the product condensate flow (65), withdrawn from the liquid exchange apparatus 1, to the starting or evaporating low pressure level in a continuously controlled throttle valve (13); and, one of using the product vapor flow (63) as an internal auxiliary energy source for controlled drive of the liquid exchange apparatus, wherein the product vapor flow (63) is tapped from the high pressure zone and is continuously controlled by a throttle valve (12) before entering its separate displacement chamber (1d) from which it is then supplied into the low pressure absorber (2) and (3), and using an electrically driven, hermetically sealed low pressure pump (14) for depressurization of the supplying enriched starting solution flow rate (61) before entering the displacement chamber (1b) and wherein the liquid exchange is continuously controlled by a throttle valve (15).

2. A method according to claim 1, wherein the depleted solution flow (60) transfers its pressure energy into a separate first part (1.1) of the liquid exchange apparatus (including chamber 1a) to a portion of the enriched starting solution flow (61) (chamber 1b) which is equal in mass flow rate to the solution flow (60); and wherein the separate first part of the liquid exchange apparatus (1.1) is additionally driven in a controllable manner by an auxiliary drive source; and wherein the product condensate flow (65) transfers its pressure energy into a separate second independently operated part of the liquid exchange apparatus (1.2) (chamber 1f) to the remaining part of enriched starting solution (62) (chamber 1c) which corresponds in its mass flow to condensate flow (65); and wherein the product condensate flow (65), withdrawn from the separate second part of the liquid exchange apparatus (1.2) is supplementally depressurized to the low pressure starting level in a continuously controlled throttle valve (13); and wherein the partial liquid exchange rate of the liquid exchange apparatus (1.2) is adapted by a supplemental depressurization of the product condenste flow rate in throttle valve (13).

3. The method as claimed in claim 2, wherein the separate first part of the liquid exchange apparatus (1.1) driven by the depleted solution (60), is additionally driven by product vapor (63) which is tapped from the high pressure zone and is continuously controlled by a throttle valve (12) before entering a separate displacement chamber of the liquid exchange apparatus (1.1); and wherein the partial liquid exchange rate of the liquid exchange apparatus (1.1) is adapted by the controlled pressurization of product vapor flow (63) in throttle valve (12).

4. The method as claimed in claim 2, wherein the sepearate first part of the the liquid exchange apparatus (1.1), is driven by the depleted solution (60), where in addition the liquid flow of enriched solution (61), before entering the separate first part of the liquid exchange apparatus (1.1) (chamber 1b) is prepressurized by an electrically driven hermetically sealed low pressure pump (14); and wherein the flow rate of the enriched solution (61) is continuously controlled by a throttle valve (15); and wherein the partial liquid exchange rate of the liquid exchange apparatus (1.1) is adapted by the flow rate of the prepressurized enriched starting solution (61).

5. An $NH_3$-$H_2O$ absorption refrigeration system and/or distillation system comprising: positive displacement fluid pumping means (1) for positively displacing fluid, said pumping means including a plurality of high pressure ports and a plurality of low pressure ports; an upstream first enriched solution conduit (61a) carrying a first enriched solution at a low pressure level to a low pressure port of said positive displacement fluid pumping means; a first heat exchanger (8); a downstream first enriched solution conduit (61b) carrying a first enriched solution at a high pressure from a high pressure port of said positive displacement fluid pumping means to said first heat exchanger; an adiabatic rectification column (5,6); a first enriched solution connection conduit (61c) carrying a first enriched solution from said first heat exchanger to said adiabatic rectification column; a generator (4) connected to said rectification column; a dephlegmator (7) connected to said rectification column; said dephlegmator receiving a portion of the fluid from said first enriched solution, another portion of said first enriched solution exiting said rectification column as a depleted solution directed to said generator as a generator input, said generator outputting a depleted solution at a pressure level higher than said low pressure level; a depleted solution connection conduit (60a) carrying said depleted solution at a pressure level to said first heat exchanger; an upstream depleted solution conduit (60b) carrying said depleted solution at a pressure level from said first heat exchanger to a high pressure port of said positive displacement fluid pumping means, the mass rate of flow of said depleted solution at a pressure level being substantially equal to the mass rate of flow of said first enriched solution, work done by said positive displacement pumping means in raising the pressure level of said first enriched solution from said low pressure level to said high pressure level being accomplished by said depleted solution at a pressure level acting on said positive displacement pump means and by an additional pressure source (63a, 15) acting on said positive displacement pumping means; at least one absorber (2); a downstream depleted solution conduit (60c) carrying said depleted solution at a pressure level equal to said low pressure level to said at least one absorber, said upstream first enriched solution conduit (61a) being connected to an outlet of said at least one absorber; a condenser (9); a first refrigerant vapor conduit (65a) connected to said dephlegmator and to said condenser for carrying refrigerant vapor from said dephlegmator to said condenser; a second heat exchanger (11); a refrigerant condensate conduit (65b) connected to said condenser and connected to said second heat exchanger, said refrigerant condensate conduit carrying refrigerant condensate at a pressure level equal to said high pressure level from said condenser to said second heat exchanger; an upstream condensate conduit (65c) connected to said second heat exchanger and connected to said positive displacement pumping means for feeding condensate at said high pressure level to said positive displacement pumping means; an evaporator (10); a downstream condensate conduit (65d) connected to said positive displacement pumping means and connected to said evaporator, said downstream condensate conduit carrying condensate existing said positive displacement pumping means to said evaporator; an upstream refrigerant solution conduit (64a) connected to said positive displacement pumping means and connected to said evaporator for carrying refrigerant solution from said evaporator to said positive displacement pumping means; downstream refrigerant solution conduit (64b) connected to said positive displacement pumping means and connected to said second heat exchanger for feeding refrigerant solution from said positive displacement pumping means to said second heat exchanger; an upstream second enriched solution conduit (62a) connected between said at least one absorber and said positive displacement pump means, said upstream second enriched solution conduit carrying a second enriched solution at said low pressure level to said positive displacement pump means; a downstream second enriched solution conduit (62b) connected between said positive displacement pump means and said dephlegmator; said downstream second enriched solution conduit carrying a second enriched solution at said high pressure level to said dephlegmator as a coolant, work done by said positive displacement pumping means in raising the pressure of said second enriched solution from said low pressure level to said high pressure level and work done by said positive displacement means in feeding refrigerant solution to said second heat exchanger being accomplished by said condensate at high pressure acting on said positive displacement pump means.

6. An absorption refrigerator system and/or distillation system, according to claim 5, wherein: said additional pressure source acting on said positive displacement pumping means includes a refrigerant vapor pressure conduit (63a) connected between said refrigerant vapor conduit (65a) and said positive displacement pump means, carrying a portion of said refrigerant vapor to said positive displacement pump means to provide additional pressure.

7. An absorption refrigeration system and/or distillation system according to claim 5, wherein said additional pressure source acting on said positive displacement pumping means includes a pressure pump (15) raising the pressure of said first enriched solution.

8. An absorption refrigeration system and/or distillation system, according to claim 5, wherein: said positive displacement means includes a rotary expansible chamber device including a housing (24) defining a housing chamber, a rotor (22) adapted to rotate about a central rotor shaft (21) within said housing chamber, said rotor having n lobes defining n chambers between adjacent lobes and between said rotor and said housing, n−1 sealing members being provided biased toward said rotor, abutting said rotor, a high-pressure port being positioned on one side of each said sealing member and a low pressure port being provided on an opposite side of each said sealing member.

9. An absorption refrigeration system, according to claim 8, wherein: said rotary expansible chamber device including three high pressure ports and three low pressure ports, each high pressure portion cooperating with a low pressure port to provide positive displacement between ports.

10. An absorption refrigeration system and/or distillation system according to claim 5, wherein: said positive displacement fluid pumping means includes a first pumping means having at least a driving high pressure port and a corresponding low pressure port and at least an additional driven high pressure port, and a second pumping means including at least a driving high pressure port and a corresponding low pressure port and at least one driven high pressure port and low pressure port.

11. An absorption refrigeration system according to claim 5, wherein: said positive displacement fluid pumping means includes a first piston and cylinder arrangement and a second piston and cylinder arrangement.

* * * * *